Feb. 7, 1928.  
F. J. MacDONALD  
1,658,567  
METHOD AND APPARATUS FOR MAKING FORMED ARTICLES FROM MOLDABLE MATERIAL  
Original Filed Jan. 28, 1925  2 Sheets-Sheet 1
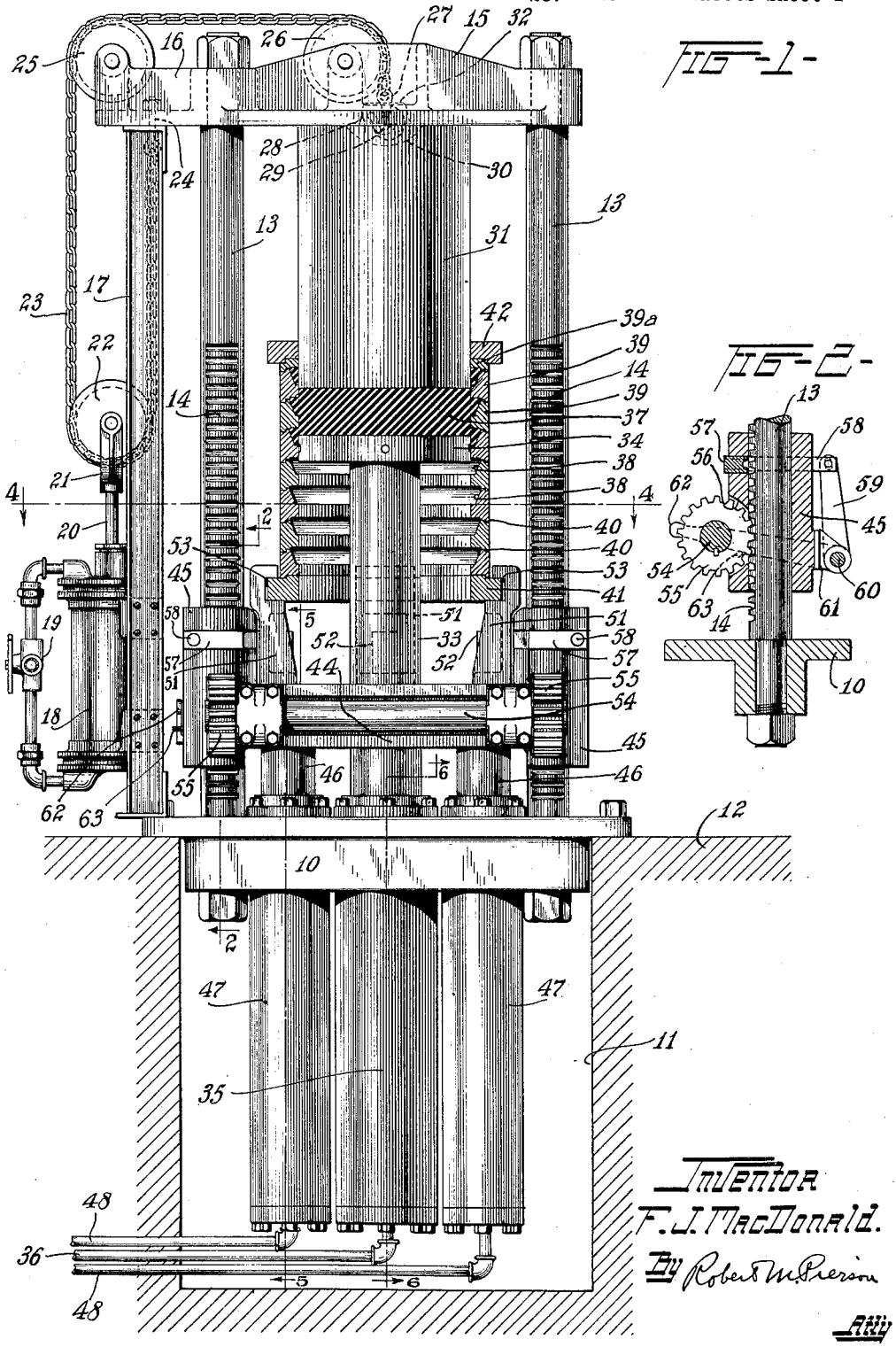
Inventor  
F. J. MacDonald.  
By Robert M. Pierson  
Atty

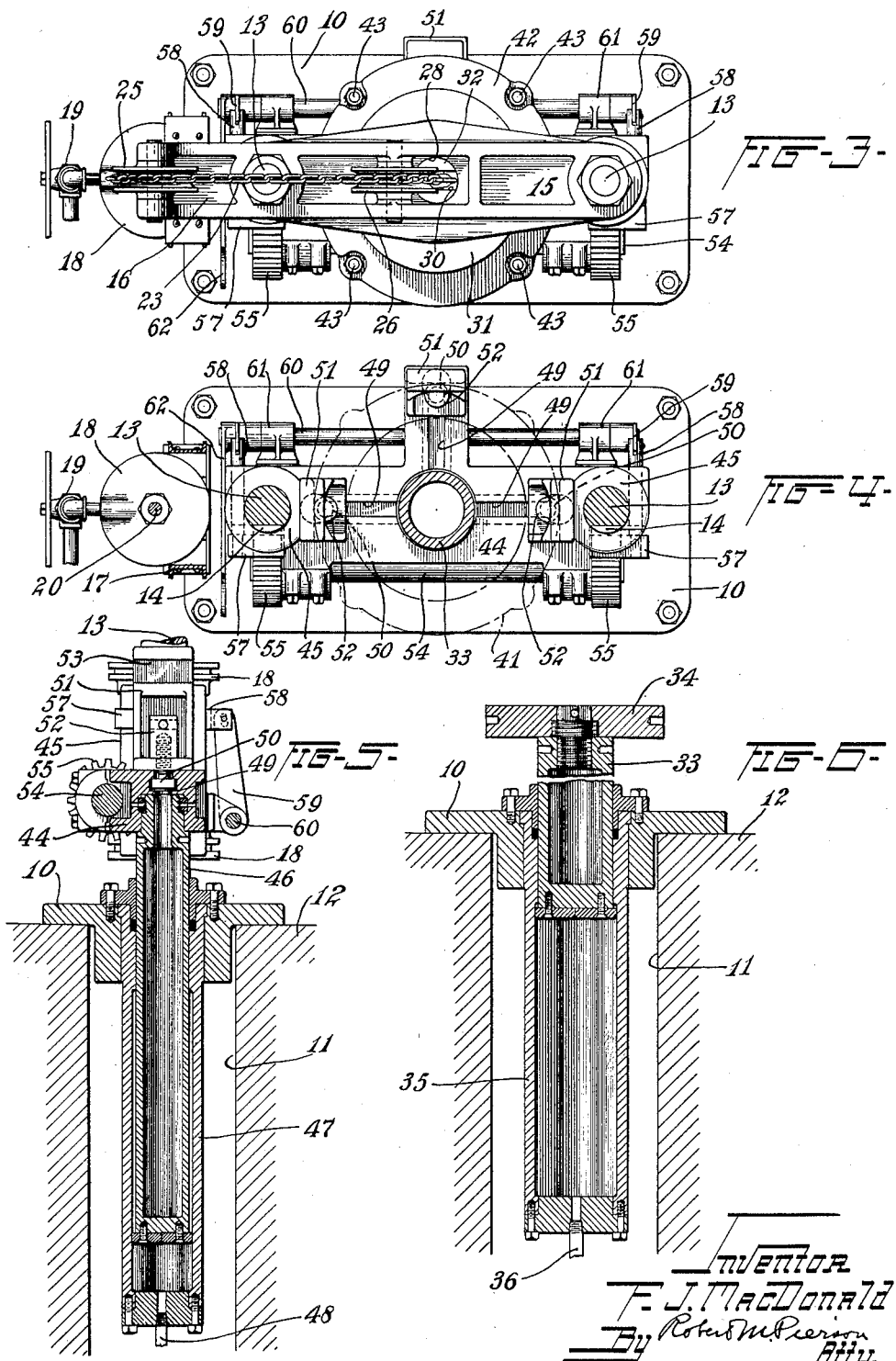

Patented Feb. 7, 1928.

1,658,567

UNITED STATES PATENT OFFICE.

FRANK J. MacDONALD, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING FORMED ARTICLES FROM MOLDABLE MATERIAL.

Application filed January 28, 1925, Serial No. 5,231. Renewed August 15, 1927.

This invention relates to the art of producing formed articles from moldable material, such, for example, as a vulcanizable rubber compound. Some of the features of procedure and apparatus involved in my present invention are described and claimed in my copending applications Serial No. 697,009, filed March 5, 1924, Serial No. 704,503, filed April 5, 1924, Serial No. 713,077, filed May 13, 1924, and Serial No. 714,287, filed May 19, 1924, all of said applications relating to methods and apparatus wherein a mass of plastic stock is pressed against a surface while being relatively moved along the same so as to give off stock as a layer upon said surface.

The chief objects of my present invention are to provide for the rapid molding of successive articles and for setting or vulcanizing the same under high pressure without requiring the actuation of mold closing means during the vulcanizing operation. A further object is to provide for the use of vulcanizers of the pot heater type, of large capacity, instead of vulcanizers of the steam platen type which heretofore have been commonly used, for many kinds of molded rubber goods. A more specific object is to avoid the formation of mold-fins or rands on the product. Other objects are to provide for the rapid molding of successive articles of annular form, and for conveniently molding an annular article, of exact section, substantially without a mold fin or rand, from a non-annular mass of stock.

Of the accompanying drawings:

Fig. 1 is an elevation of a machine embodying and adapted to carry out my invention in its preferred form, parts of the same being shown in section.

Fig. 2 is a section on line 2—2 of Fig. 1.

Fig. 3 is a plan view of the machine.

Fig. 4 is a section on line 4—4 of Fig. 1.

Fig. 5 is a section on line 5—5 of Fig. 1.

Fig. 6 is a section on line 6—6 of Fig. 1.

Referring to the drawings, the machine comprises a base casting 10 bridging a well 11 formed in a foundation 12, from which base casting rises a pair of guide-posts 13, 13 each formed with a set of rack teeth 14. The tops of said guide-posts are connected by a cross-beam 15 having an extension 16 beyond one of the guide-posts, said extension being provided with a supporting brace 17 which rises from the base-casting 10. Secured to one side of said supporting brace 17 is a vertical fluid-pressure cylinder 18 provided with the usual connections to a four-way valve 19 for actuating its piston in either direction, preferably by compressed air, and the piston rod, 20, is provided with a bearing fork 21 in which is journaled a pulley 22 mounted in a downwardly extending loop of a chain 23 having one end secured at 24 to the extension 16 of the cross-beam 15, said chain toward its other end running over a pulley 25 journaled on the extension 16 and a pulley 26 journaled on the cross-beam 15, that end portion of the chain being provided with a hook 27 and adapted to extend downward from the pulley 26, through an aperture 28 formed in the cross-beam 15, to engage a cross-pin 29 extending across a recess 30 formed in the upper end face of a cylindrical shaping member or mandrel, such as the one shown at 31, to raise the mandrel against the under face of the cross-beam 15 or lower it therefrom, by the actuation of the fluid-pressure cylinder 18. Each mandrel 31 is provided on its upper end face with a central tapered dowel 32 adapted to enter the aperture 28 in the cross-beam 15, for accurately positioning the mandrel as it is drawn up against the cross-beam.

Opposed to the lower face of a mandrel thus mounted in the machine is a press-plunger or ram 33 having a circular head 34 of the same diameter as that of the cylindrical mandrel, said plunger being mounted in a vertical fluid pressure cylinder 35 which is mounted in the base-casting 10, extending downward therefrom into the well 11, and provided at its lower end with a pipe 36, running to suitable connections (not shown), for charging and discharging the cylinder, preferably with water, to raise the ram and to permit it to descend by gravity, said ram being adapted to coact with the mandrel 31 to extrude a mass of plastic stock, such as the rubber compound 37 here shown, from between the two, to cause said stock to flow into successive annular mold cavities 38, 38 defined by a mold structure comprising a set of annular mold rings 39, 39, 39ª as said mold structure is moved past the compressed mass of stock, in close-fitting, telescoped relation to the mandrel 31 and ram-head 34. The mold rings 39 are complementally rabbeted on their end faces as shown at 40, 40, to maintain their registry with each other, and the lowermost and uppermost mold rings are similarly interfitted with end rings 41 and 42 respectively, for clamping the mold assembly together, the uppermost mold ring, $39^a$, being of a suitably modified form, so that it, as well as the other mold rings, may be of steel, for a smooth molding surface, while the end rings may be of less expensive and less finished metal, such as cast iron. The end rings 41 and 42 extend outward beyond the stack of mold rings and are formed with apertures for clamping bolts 43, 43, Fig. 3, for drawing them together upon the assembly of mold rings.

For raising the mold assembly past the compressed mass of stock, in telescoped relation to the ram-head 34 and mandrel 31, a cross-head 44, centrally apertured for the passage of the ram 33 and formed with guide portions or sleeves 45, 45 slidably mounted upon the guide posts 13, is secured upon the upper ends of a pair of plungers 46, 46 mounted in respective fluid-pressure cylinders 47, 47 which are secured in the base-casting 10, and extend downward therefrom into the well 11, each being provided at its lower end with a pipe 48, running to suitable connections (not shown), for charging and discharging them, preferably with water, to raise the cross-head 44 and to permit it to descend by gravity.

The cross-head 44 is formed on its upper face with three radial under-cut grooves 49, 49 in each of which is slidably mounted a clamping bolt 50 extending upward through an aperture in the base of a mold-supporting bracket 51 and being provided with a spanner nut 52 above said base, for securing the respective brackets at different positions of adjustment radially of the cross-head, to support mold assemblies of different diameters. Each bracket is formed, on the inner face of its upper end portion, with a notch 53 to receive the peripheral portion of the lower end ring 41 of the mold assembly as the latter is introduced, from a horizontal direction, to the three brackets.

To assure that the two cylinders 47 will raise and lower the cross-head without cramping it upon the guide-posts 13, a shaft 54 is journaled on the cross-head and at each end has secured thereon a pinion 55 meshed, through a suitable aperture 56, Fig. 2, in the adjacent guide portion or sleeve 45 of the cross-head, with the set of rack teeth 14 formed on the adjacent guide-post 13.

For holding the cross-head and mold assembly thereon at different elevations, each of the sleeves 45 is formed with a horizontal recess extending from its front face and opening into its vertical guide aperture, in which recess is slidably mounted a block 57 formed with teeth (see Fig. 2) adapted to mesh or interfit with the rack teeth formed on the adjacent guide-post 13, said blocks being adapted simultaneously to be meshed and unmeshed by a slide-bar 58, mounted in a horizontal aperture in the sleeve 45 and having pin-and-slot connection with an arm 59 secured to a horizontal rock-shaft 60 which is mounted upon suitable brackets 61, 61 projecting from the rear sides of the sleeves 45, said shaft being provided at one end with a hand lever 62 adapted normally to rest, of its own weight, against a stop pin 63 (Figs. 1 and 2) projecting from the adjacent sleeve 45, to hold the blocks 57 out of locking position.

In the preferred method of operation, the crosshead 44 and ram 33 being in their lowermost positions, a mandrel 31 is mounted upon the hook 27 and raised into position against the cross-beam 15, being positioned by the dowel 32. A mass of plastic stock, such as a rubber compound at suitable temperature, is then placed upon the ram-head 34, whose lowermost position is well below the recesses 53 of the mold-supporting brackets 51, and a mold assembly 38—42 is passed horizontally over the mass of stock so that its lower end ring 41 enters the recesses 53 of the three brackets 51, as will be clear upon reference to Fig. 1, the mold assembly being suitably aligned with the mandrel 31 by contact with the vertical walls of said recesses.

The cylinders 47 are then slowly charged, hydraulic pressure preferably being used, for a steady, non-resilient rise, and the mold assembly is thus raised until it telescopes with the mandrel 31, but only to such extent that the lower end of the mandrel does not overlap the upper mold cavity 38, the fluid supply of the cylinders being then cut off. The hand lever 62 also may be raised, to engage the blocks 57 with the rack teeth 14, if this is found to be of any assistance in correctly positioning the mold assembly, although ordinarily this is not necessary. The cylinder 35 is then charged, preferably but not necessarily with a liquid such as water, raising the ram-head 34, with the plastic stock thereon, until it strongly compresses the stock against the lower face of the mandral 31 and flows the stock into such of the uppermost mold cavities as are in communication with the space between the mandrel and the ram-head.

The cylinders 47 are then further charged, causing the mold-assembly to resume its upward movement, while the ram-head continues its pressure upon the stock, under the force of the cylinder 35. As one after another of the mold cavities 38 are brought into communication with the supply mass of stock by the upward movement of the mold assembly, they are successively filled with stock flowing thereinto from said mass. As the mold assembly thus moves in telescoped relation to the mandrel 31 the latter tightly closes off the cavities in succession, while the stock within the cavity is under high compression, the mandrel shearing off the stock at the mouth of the cavity.

When the mold-assembly is fully telescoped with the mandrel, with all of its cavities filled, the cylinders 35 and 47 are discharged and the cylinder 18 is reversed, to permit the mold assembly, the mandrel therein and the ram-head to descend together, the ram-head continuing to descend, to clear the mold assembly, after the cross-head 44 has reached its lowermost position. The chain hook 27 is then detached from the mandrel and the mold and mandrel assembly is slid from the brackets 51 and subjected to vulcanizing heat, with other charged assemblies similarly produced, in a suitable vulcanizer, which may be of a simple steam-chamber or pot heater type, whereby the molded articles, here shown as packing or sealing rings of a known form, are vulcanized, the mandrel and mold assembly maintaining them under high compression during the cure.

The mold assembly, with the vulcanized rings and the mandrel therein, is then again mounted in the apparatus here shown, with the cross-head 44 locked in its lowermost position by means of the hand lever 62 and blocks 57, and the cylinder 35 is charged to cause the ram-head 34 to force the mandrel upward out of the mold assembly.

The ram may be assisted in this mandrel ejecting operation by the cylinder 18 and chain 23.

The sectional mold structure is then taken apart and the finished rings are removed, after which the mold structure is reassembled for a repetition of the operation as described.

The mold rings may be so closely interfitted as to avoid the formation of any substantial mold fin on the work at their parting plane, and mold fins at the inner periphery of the work also may be avoided by close-fitting of the mandrel with the mold rings, the stock being cleanly sheared off and entrapped in the mold cavity under compression. The pressure of the entrapped stock upon the mandrel, which constitutes a closure member for the molds, is balanced or neutralized, so that no mold-locking means is required to be applied or set up after the cavities have been filled, the mandrel being interlocked with the mold structure against the force of the entrapped stock.

Other objects set out above are also attained in the use of my invention as described.

Modifications may be resorted to within the scope of my invention, and I do not wholly limit my claims to the exact procedure or the specific construction described.

I claim:

1. The method of making an article from moldable material which comprises flowing stock from a supply mass into a mold cavity, maintaining the stock in said cavity under pressure applied through the supply mass while shearing off and entrapping under pressure the stock in said cavity, and causing the same to set without release of said pressure while it is held so entrapped, the mold cavity being defined by mold members whereby the entrapped stock is completely enclosed and held under pressure during the setting operation.

2. The method of making an article from a vulcanizable rubber compound which comprises flowing stock from a supply mass into a mold cavity, maintaining the stock in said cavity under pressure applied through the supply mass while shearing off and entrapping under pressure the stock in said cavity, and vulcanizing the same without release of said pressure while it remains in said cavity, the mold cavity being defined by mold members whereby the entrapped stock is completely enclosed and held under pressure during the vulcanizing operation.

3. The method of making an annular article from moldable material which comprises forcing stock from a supply mass into an annular mold cavity by flow transverse to the axis of the annulus, and maintaining the stock in said cavity under pressure applied through the supply mass while shearing off the stock in said cavity, by a shearing action directed axially of the annulus.

4. The method of making an annular article from moldable material which comprises forcing stock from a supply mass into an annular mold cavity by flow transverse to the axis of the annulus, maintaining the stock in said cavity under pressure applied through the supply mass while shearing off and entrapping under pressure the stock in said cavity, by a shearing action directed axially of the annulus, and causing the stock in said cavity to set while it is so held entrapped.

5. The method of making an annular article from moldable material which comprises forcing stock from a non-annular supply mass into an annular mold cavity about the periphery of said supply mass, and maintaining the stock in said cavity under pressure applied through the supply mass while shearing off the stock in said cavity, at its inner periphery, by a shearing action directed axially thereof.

6. The method of making annular articles of plastic material which comprises maintaining a supply mass of stock under pressure while so relatively moving it in an axial direction past a series of annular mold cavities as to cause stock to be given off therefrom into said cavities in succession and so shearing off the stock thus forced into said cavities a to leave each cavity filled with a substantially segregated mass of stock.

7. The method of making annular articles of plastic material which comprises maintaining a non-annular mass of stock under pressure while so relatively moving it in an axial direction past a series of annular mold cavities encircling the mass as to cause stock to be given off from the periphery of said supply mass into said cavities in succession and so shearing off the stock thus forced into said cavities as to leave each cavity filled with a substantially segregated mass of stock.

8. The method of making annular rubber articles which comprises maintaining a supply mass of vulcanizable rubber stock under pressure while so relatively moving it in an axial direction past a series of annular mold cavities as to be given off therefrom into said cavities in succession, maintaining the stock in each cavity under pressure applied through the supply mass while shearing off and entrapping under pressure the stock in said cavity, as a substantially segregated mass, and vulcanizing concurrently the masses of stock while they are held so entrapped.

9. Molding apparatus comprising a mold structure having a plurality of adjacent mold cavities, a closure member therefor adapted to close off said cavities in succession by a shearing and closing action across the mouths thereof, and means for filling the cavities in succession with stock and holding the stock in each cavity under pressure as it is sheared off and the cavity closed by the said closure member, said mold structure and said closure member being adapted by such closing action to interlock against the pressure of stock within the cavity, and to be readily transported in such interlocked condition.

10. Molding apparatus comprising a mold structure having a molding cavity, means for flowing stock into said cavity from a supply mass of stock and maintaining it therein under pressure applied through the supply mass, and a closure member for said mold structure adapted to close off said cavity, by a shearing and closing action across the mouth thereof, while the stock in said cavity is so held under pressure, said mold structure and closure member being adapted by such closing action to interlock against the pressure of the stock within the cavity, and being readily transportable in such interlocked condition.

11. Molding apparatus comprising a mold structure formed with an annular, circumferential, molding cavity, a telescopically mating structure therefor, one of said structures being non-taperedly male and the other non-taperedly female, and said mold structure being adapted to interfit with said mating structure at either side of said cavity, said mating structure being adapted to shear off stock in said cavity as a segregated annular mass by relative axial movement in telescoped relation to said mold structure, a second structure mating with said mold structure and adapted to coact with the first said mating structure so to compress a supply mass of stock while effecting its relative movement past the molding cavity as to fill the latter therefrom, and yielding means for urging the first and second said mating structures toward each other to compress the supply mass of stock while they move in the same direction with relation to the mold structure.

12. Molding apparatus comprising a non-taperedly female mold structure having an annular, circumferential, molding cavity formed in its inner face, a complemental male closure member therefor interfitting therewith at both sides of said cavity and adapted to close off said cavity and shear off stock therein as a segregated annular mass by relative axial movement in telescoped relation to said female structure, a male stock-pressing member telescoped in said mold structure and opposed to said male closure member therein, and yielding means for urging said male members toward each other.

13. Molding apparatus comprising complemental, non-taperedly male and female molding elements in telescoped relation, one of the same being formed with a molding cavity in its face adjacent the mating element and adapted slidably to interfit with said mating element at both the front and the rear side of said cavity, and yielding means for pressing stock into the angle of said elements, at the leading end of the said mating element, the said elements being mounted for relative movement into such relation that the cavitied element will interfit with the mating element at both the front and the rear side of the cavity.

14. Molding apparatus comprising a female shaping structure and a male shaping structure mounted for relative axial movement in telescoped relation thereto, one of said structures being formed with a plurality of individual molding cavities adapted to be completely closed off by the other structure in such relative axial movement.

15. Molding apparatus comprising interfitting, non-taperedly male and female shaping structures relatively movable in telescoped relation, one of the same being formed with a plurality of mold cavities having respective mouths each completely bounded individually by surface adapted to interfit with the other shaping structure, and means for pressing plastic stock into the angle of the two at the leading end of said other shaping structure as they are relatively moved axially in telescoped relation.

16. Apparatus as defined in claim 15 in which the two shaping structures are adapted to be readily transported as a unit in interfitted relation.

17. Apparatus as defined in claim 15 in which the mold cavities are annular and surround the axis of the shaping structures.

18. Molding apparatus comprising a non-taperedly male shaping member, a sectional, non-taperedly female mold structure having a plurality of annular mold cavities extending circumferentially of its inner face, said inner face being adapted to interfit with said male shaping member throughout a complete, circumferential zone at each side of each cavity, and means for so pressing a mass of plastic stock against the forward end of said male shaping member as it is moved telescopically in said female mold structure as to cause stock to be given off from said mass into said cavities in succession.

19. Molding apparatus comprising male and female shaping structures adapted slidably to interfit in telescoped relation, and means for pressing a mass of plastic stock into the angle of the two at the leading end of one of them as they are moved in such relation, the other of said structures being formed as a series of transversely disposed, separable sections each having an annular face adapted for complete, circumferential, slidably interfitting relation to the other structure, and each pair of adjacent sections defining a completely circumferential molding cavity.

20. Apparatus as defined in claim 19 in which the two shaping structures are adapted to be readily transported as a unit in interfitted relation.

21. Molding apparatus comprising a female mold structure, a mandrel adapted to telescope therein, and a press adapted to move the same relatively in telescoped relation for inserting and removing the mandrel, said mold structure and mandrel being readily separable from said press as a unit while in telescoped relation.

22. Molding apparatus comprising a female mold structure, a male member adapted to constitute one head of a press and to telescope within said female mold structure, a second male member adapted to constitute the other head of said press and to telescope within said female member, means for urging said male members toward each other, telescoped within said female mold structure, and means for moving said female mold structure in such telescoped relation to said male members, one of the latter and the mold structure being readily removable from the rest of the apparatus, in telescoped relation, as a unit, the press-head actuating means and the mold moving means being adapted for the subsequent forcing of the male member from within the female mold structure.

23. Shaping apparatus comprising means for supporting a supply mass of plastic material and means adapted to coact therewith to effect formation of the material into a succession of substantially segregated rings.

24. Shaping apparatus comprising means adapted to define a stock-enclosing space for a supply mass of stock and to maintain a pressure thereon, and means for alternately opening and closing an annular outlet from the said space to effect an extruding and shearing off of successive annular masses of stock.

25. The method of shaping an article of vulcanizable plastic material which comprises so pressing a mass of stock against a shaping member as to cause said stock to extend itself as a layer lying against and substantially within the limits of said shaping member while causing another shaping member to move along with said layer, at approximately the same speed, and to press against the same, as said layer so extends itself upon the first shaping member, and vulcanizing the stock in contact with one of said shaping members, the supply mass of stock in the shaping operation being completely enclosed except as to air-venting spaces and constantly subjected to the force of a yielding-pressure member throughout the formation of a succession of separate articles by subtraction of stock therefrom.

26. Apparatus for shaping an article of plastic material, said apparatus comprising a rigid shaping member, a rigid member adapted so to press a mass of stock thereagainst as to cause it to extend itself by flow thereon, a rigid member adapted to move in the same direction as the flowing stock and to confine the same, each of the three members being movable with relation to the others, during the shaping operation, and positive means for moving one of said members with relation to another, the other member of the three being yieldingly urged, so as to accommodate its movement to the action of said positive means, the said pressing member being the yieldingly urged member, the member moving with the flowing stock being a multiple-cavity mold, and the three members constituting at least a part of a structure of rigid members completely enclosing the stock except as to air-venting spaces.

27. The method of producing a vulcanized rubber article which comprises relatively moving a supply mass of unvulcanized rubber composition continuously along and in contact with the cavitied face of a multiple-cavitied mold, past a plurality of the cavities thereof, while maintaining the supply mass completely enclosed and under the force of a yielding pressure member, so that stock from the supply mass is forced into the mold cavities and sheared off at the mouths thereof while held under such force, and vulcanizing the stock in the cavities while it remains therein.

28. Molding apparatus comprising a multiple-cavity mold having between its cavities lands which are flush with each other, a plurality of rigid stock-confining members adapted with the cavitied face of said mold completely to enclose a supply mass of plastic material and movable with relation to each other to reduce the size of the enclosed space, fluid-pressure means for effecting such relative movement, and means for moving the mold relatively past said stock-confining members in a single movement such as to present a plurality of its cavities in succession to the supply mass of stock and cause the said lands to coact with one of said members to shear off at the mouths of the cavities masses of stock forced into the cavities.

In witness whereof I have hereunto set my hand this 26th day of January, 1925.

FRANK J. MacDONALD.